US012687194B2

(12) United States Patent
Lin

(10) Patent No.: US 12,687,194 B2
(45) Date of Patent: Jul. 21, 2026

(54) TRIAXIAL SPHERICAL UNIVERSAL JOINT STRUCTURE

(71) Applicant: Chien-Ting Lin, Santa Fe Springs, CA (US)

(72) Inventor: Chien-Ting Lin, Santa Fe Springs, CA (US)

( * ) Notice: Subject to any disclaimer, the term of this patent is extended or adjusted under 35 U.S.C. 154(b) by 787 days.

(21) Appl. No.: 17/868,772

(22) Filed: Jul. 20, 2022

(65) Prior Publication Data

US 2023/0022824 A1     Jan. 26, 2023

(30) Foreign Application Priority Data

Jul. 20, 2021     (CN) .......................... 202121650625.4

(51) Int. Cl.
F16C 11/10          (2006.01)

(52) U.S. Cl.
CPC ..... F16C 11/106 (2013.01); *Y10T 403/32311* (2015.01)

(58) Field of Classification Search
None
See application file for complete search history.

(56) References Cited

U.S. PATENT DOCUMENTS

| | | | | | |
|---|---|---|---|---|---|
| 5,072,907 | A | * | 12/1991 | Vogt ...................... | F16C 11/106 403/90 |
| 6,386,786 | B1 | * | 5/2002 | Perlman .................. | F16L 3/085 403/374.2 |

| | | | | | |
|---|---|---|---|---|---|
| 6,561,476 | B2 | * | 5/2003 | Carnevali .............. | F16M 11/14 248/181.1 |
| 6,726,392 | B2 | * | 4/2004 | El-Haw ................... | F16C 11/06 403/56 |
| 11,346,473 | B2 | * | 5/2022 | Lin ........................ | F16B 7/1418 |
| 2006/0175482 | A1 | * | 8/2006 | Johnson ................. | F16M 11/14 248/176.1 |
| 2012/0294028 | A1 | * | 11/2012 | Wainscott ........... | F16C 11/0695 362/528 |

FOREIGN PATENT DOCUMENTS

| | | | | | |
|---|---|---|---|---|---|
| CN | 201083949 | Y | * | 7/2008 | |
| CN | 201368960 | Y | * | 12/2009 | |
| DE | 922450 | C | * | 1/1955 | ............ F16C 11/106 |
| EP | 3246615 | A1 | * | 11/2017 | .......... F16C 11/0623 |
| WO | WO-2011/134122 | | * | 12/2010 | ............ F16C 11/106 |
| WO | WO-2019205960 | A1 | * | 10/2019 | ........... F16M 11/121 |

* cited by examiner

*Primary Examiner* — Matthew R McMahon

(57)          ABSTRACT

A triaxial spherical universal joint structure includes: a body; a sphere; and a rotating shaft, wherein the body is provided with a sphere accommodating part and a rotating shaft accommodating part adjacent to each other in up-and-down directions, the sphere accommodating part extends upward to form an opening of the sphere accommodating part, the rotating shaft accommodating part extends downward to form an opening of the rotating shaft accommodating part, the body is provided with a notch extending from the opening of the sphere accommodating part to the opening of the rotating shaft accommodating part, the sphere accommodating part and the rotating shaft accommodating part are communicated with the external space via the notch, a fixing assembly is provided on the body at a position close to the notch and the opening of the sphere accommodating part, the rotating shaft may rotate horizontally in the rotating shaft accommodating part.

6 Claims, 27 Drawing Sheets

A

11

A

C

C

TRIAXIAL SPHERICAL UNIVERSAL JOINT STRUCTURE

CROSS-REFERENCE TO RELATED APPLICATION

This application claims the priority of Chinese patent application No. 202121650625.4, filed on Jul. 20, 2021, which is incorporated herewith by reference.

BACKGROUND OF THE INVENTION

1. Field of the Invention

The present invention relates to a triaxial spherical universal joint structure, in particular to a triaxial spherical universal joint structure with a body that can be opened from a notch thereof to a predetermined angle.

2. The Prior Arts

One type of existing spherical universal joint structures, such as a ball head, is made of metal. The characteristic of which is that when assembling, a sphere and a base should be put sequentially into the ball head through the bottom of a body of the ball head, and then the base is fixed by screwing a fixing bolt into the base from its lateral side to avoid the body and the base of the ball head from being separated from each other, and then a knob bolt is screwed into the ball head from its lateral side. By locking the knob bolt to press a concave position of the upper portion of the base, the base is pushed up to abut against the sphere, making the sphere stand still. By loosening the knob bolt, the base may rotate horizontally. The disadvantage of this existing structure is that the material thereof is metal and the weight thereof is heavier. When the fixing bolt is left out or loosened and the base fails to be fixed, if the knob bolt is loosened to a certain extent, the base and the body of the ball head will be separated and disengaged from each other. In this case, if there is a device connected to the top of the ball head, the device may be damaged.

The existing spherical universal joint structures, such as a ball head with a notch, use a fixing assembly to control the size of the notch to clamp or release the sphere. However, in this existing design, a fastener is provided under the sphere for connecting to other objects. When the fastener is locked, the direction of the ball head with the notch is fixed and cannot be adjusted horizontally.

SUMMARY OF THE INVENTION

To overcome the problems of the existing spherical universal joint structures such as too heavy weight, damage to other connected devices due to the disengagement of the structure, or the condition that the direction cannot be adjusted horizontally, the present invention provides a triaxial spherical universal joint structure, comprising: a body; a sphere; and a rotating shaft, wherein the body is provided with a sphere accommodating part and a rotating shaft accommodating part adjacent to each other in up-and-down directions, the sphere accommodating part extends upward to form an opening of the sphere accommodating part, the rotating shaft accommodating part extends downward to form an opening of the rotating shaft accommodating part, the body is provided with a notch extending from the opening of the sphere accommodating part to the opening of the rotating shaft accommodating part, the sphere accommodating part and the rotating shaft accommodating part are communicated with the external space via the notch, a fixing assembly is provided on the body at a position close to the notch and the opening of the sphere accommodating part, the rotating shaft may rotate horizontally in the rotating shaft accommodating part; and wherein the body is opened from the notch to a predetermined angle such that the rotating shaft is placed in the rotating shaft accommodating part and the sphere is placed wholly in the sphere accommodating part, then two portions of the body opened from the notch are moved toward each other; by locking the fixing assembly, the notch is narrowed, the sphere accommodating part and the rotating shaft accommodating part clamp the sphere and the rotating shaft, respectively, such that the sphere is pushed downward to abut against the rotating shaft, thereby disabling the sphere from rotating and disabling the rotating shaft from rotating horizontally relative to the body; conversely, enabling the sphere and the rotating shaft to rotate. The present invention may be made of plastic material to solve the problem of heavier weight; by utilizing the notch, the damage to the device at the top the ball head caused by the falling off of the sphere is avoided; and the provision of the rotating shaft enhances the function of horizontal rotation.

The technical solution adopted by the present invention to solve its technical problems is a triaxial spherical universal joint structure for connecting a first object and a second object, comprising: a body provided with a sphere accommodating part and a rotating shaft accommodating part, wherein the sphere accommodating part is adjacent to the rotating shaft accommodating part in up-and-down directions, the sphere accommodating part extends upward to external space to form an opening of the sphere accommodating part, the opening of the sphere accommodating part has a diameter less than that of the sphere accommodating part, the rotating shaft accommodating part extends downward to the external space to form an opening of the rotating shaft accommodating part, the opening of the rotating shaft accommodating part has a diameter less than that of the rotating shaft accommodating part, the body is provided with a notch extending from the opening of the sphere accommodating part to the opening of the rotating shaft accommodating part, the sphere accommodating part and the rotating shaft accommodating part are communicated with the external space via the notch, and a fixing assembly is provided on the body at an appropriate position close to the notch and the opening of the sphere accommodating part; a sphere provided with a first extension part extending outward from the sphere; and a rotating shaft having a shape suitable for rotating horizontally in the rotating shaft accommodating part; and wherein the body is opened from the notch to a predetermined angle, such that the rotating shaft is placed in the rotating shaft accommodating part and the sphere is placed in the sphere accommodating part, the rotating shaft is connected to the first object via the opening of the rotating shaft accommodating part, the first extension part passes through the opening of the sphere accommodating part and is connected to the second object, then two portions of the body opened from the notch are moved toward each other; by locking the fixing assembly, the notch is narrowed, the sphere accommodating part and the rotating shaft accommodating part clamp the sphere and the rotating shaft, respectively, such that the sphere is pushed downward to abut against the rotating shaft, thereby disabling the sphere from rotating and disabling the rotating shaft from rotating horizontally relative to the body; while by loosening the fixing assembly, the notch is broadened, the sphere is released from the sphere accommodating part and the rotating shaft is released from the rotating shaft accommodating part, such that the sphere and the rotating shaft are disengaged from each other, thereby enabling the sphere to rotate and enabling the rotating shaft to rotate horizontally relative to the body.

Preferably, the rotating shaft has a second extension part passing through the opening of the rotating shaft accommodating part and extending toward the external space.

Preferably, the first extension part is a first extension rod, wherein the first extension rod is provided with a thread at a distal end thereof relative to the sphere, a platform is provided at an appropriate position on the first extension rod, and the thread is exposed above the platform.

Preferably, a first conical surface is provided at an appropriate position on an inner side of the rotating shaft accommodating part, wherein the first conical surface narrows toward the opening of the rotating shaft accommodating part; and a second conical surface is provided at an appropriate position on an outer side of the rotating shaft, wherein the second conical surface narrows toward the opening of the rotating shaft accommodating part, and an end where the second conical surface narrows has a shape corresponding to that of the first conical surface.

Preferably, an arc-shaped surface is provided at a top of the rotating shaft, wherein the arc-shaped surface has a radian corresponding to that of the sphere.

Preferably, a rotary disc having a diameter greater than that of the opening of the rotating shaft accommodating part is further provided, wherein the rotary disc is coupled to the rotating shaft via the opening of the rotating shaft accommodating part, and wherein a first fastener is provided inside the rotating shaft, the triaxial spherical universal joint structure is provided with a central hole, the central hole extends from a center of the rotating shaft toward the rotary disc and is communicated with the external space, the rotating shaft and the first object are fixed to each other by the first fastener.

Preferably, a U-shaped groove is provided on the body at a position extending downward from the opening of the sphere accommodating part such that the sphere accommodating part is communicated with the external space via the U-shaped groove, wherein the U-shaped groove is separated from the notch by a certain distance.

The advantageous effects of the present invention are that the weight of the ball head may be reduced to prevent the sphere from falling off, and the rotation in the horizontal direction may be facilitated by the rotating shaft, thereby increasing the convenience of carrying, usage safety and usage diversity.

BRIEF DESCRIPTION OF THE DRAWINGS

The present invention will be further described with reference to the attached drawings and embodiments.

DETAILED DESCRIPTION OF THE PREFERRED EMBODIMENT

Embodiments of the present invention will be described below with reference to FIGS. 1 to 6. The description is not intended to limit the implements of the present invention, but an example of the present invention.

Figure 1:
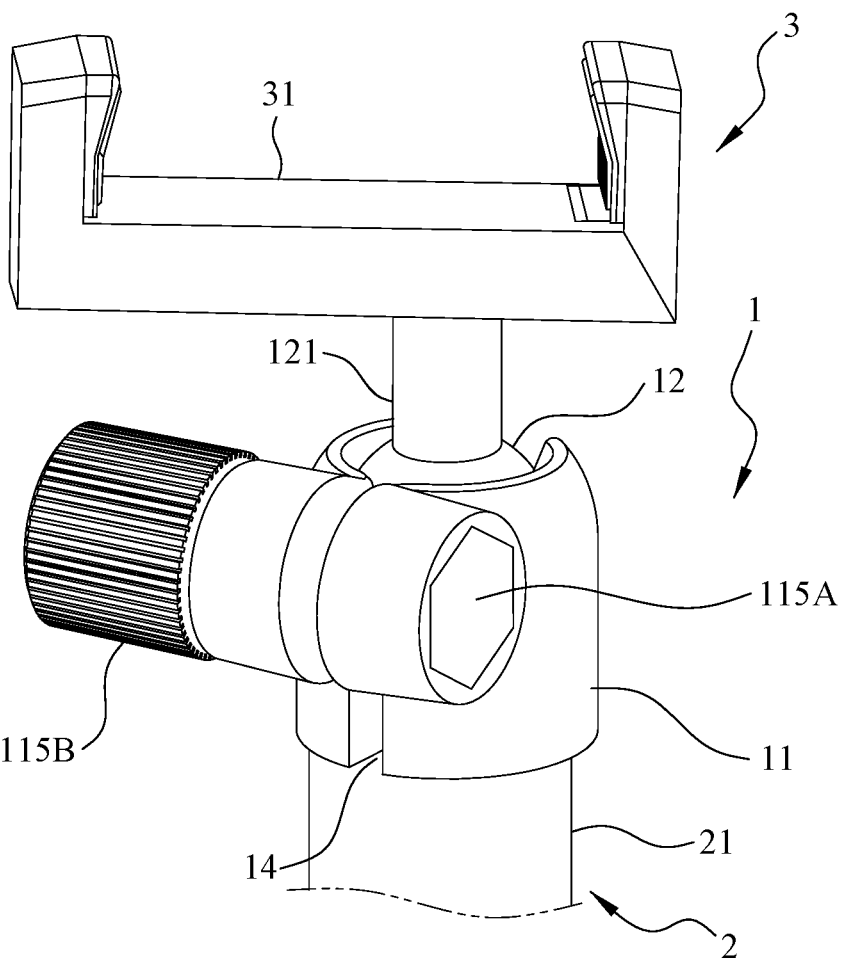
FIG. 1 is a schematic diagram according to the first embodiment of the present invention.
Figure 2A:
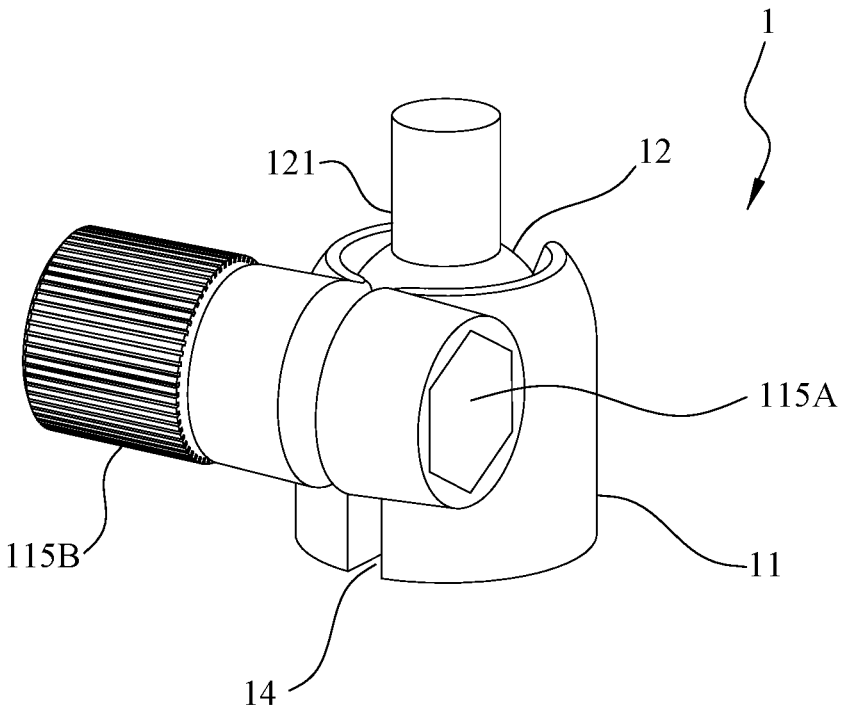
FIG. 2A is a partial schematic diagram according to the first embodiment of the present invention.
Figure 2B:
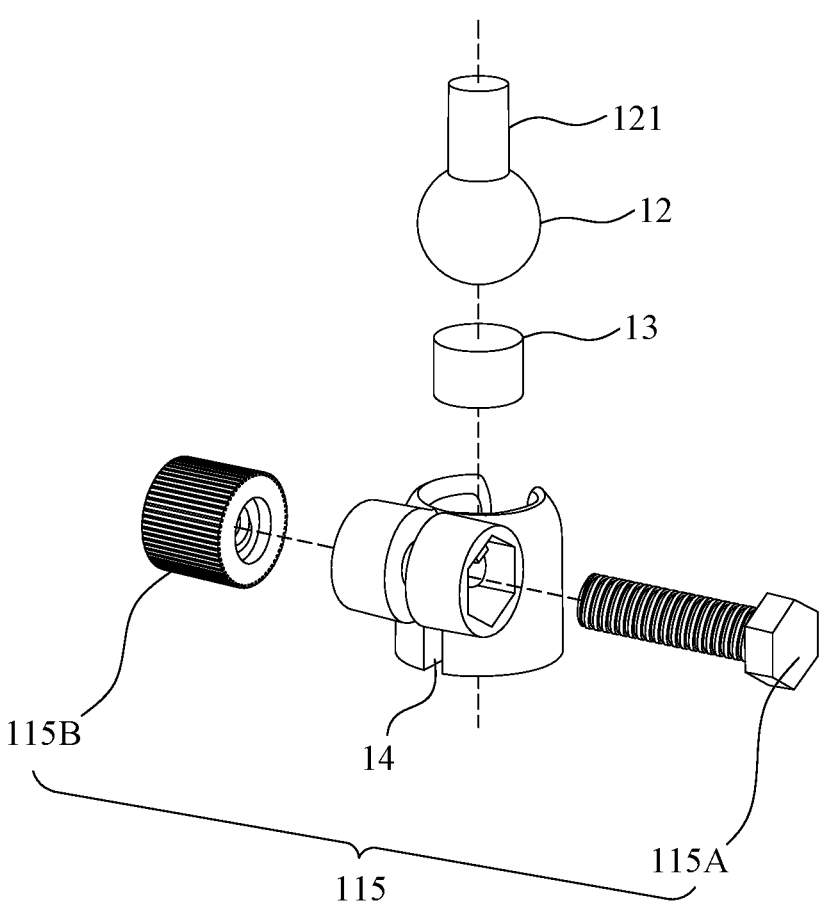
FIG. 2B is a partial exploded view according to the first embodiment of the present invention.
Figure 3A:
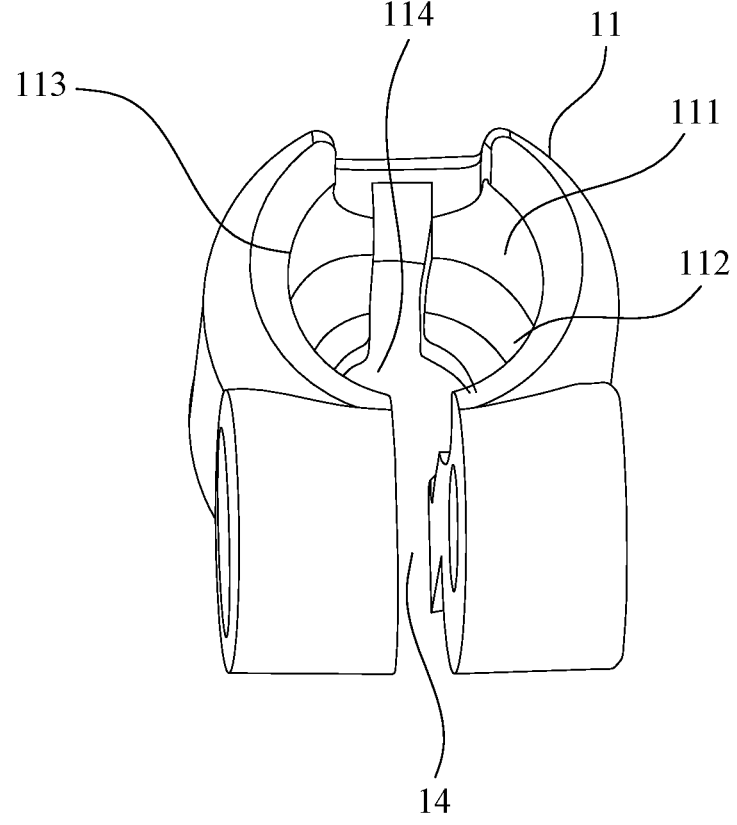
FIG. 3A is a schematic diagram of a body according to the first embodiment of the present invention.
Figure 3B:
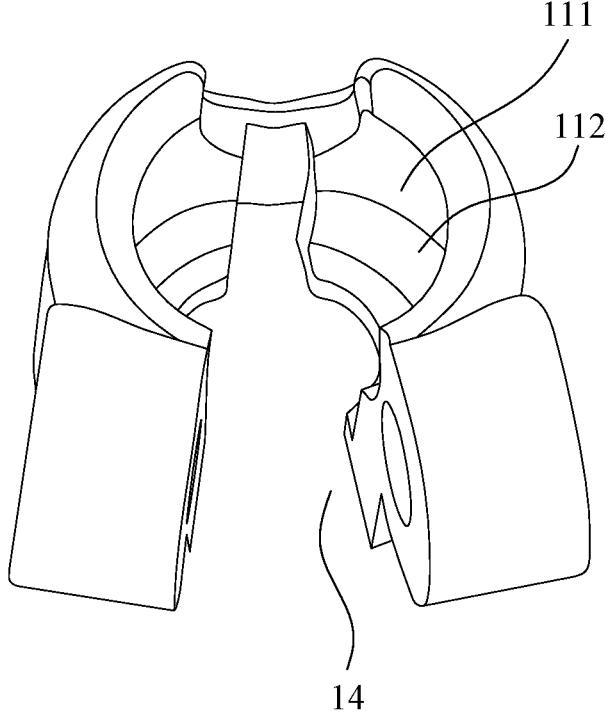
FIG. 3B is a schematic diagram illustrating that the body is opened from a notch to a predetermined angle according to the first embodiment of the present invention.
Figure 3C:
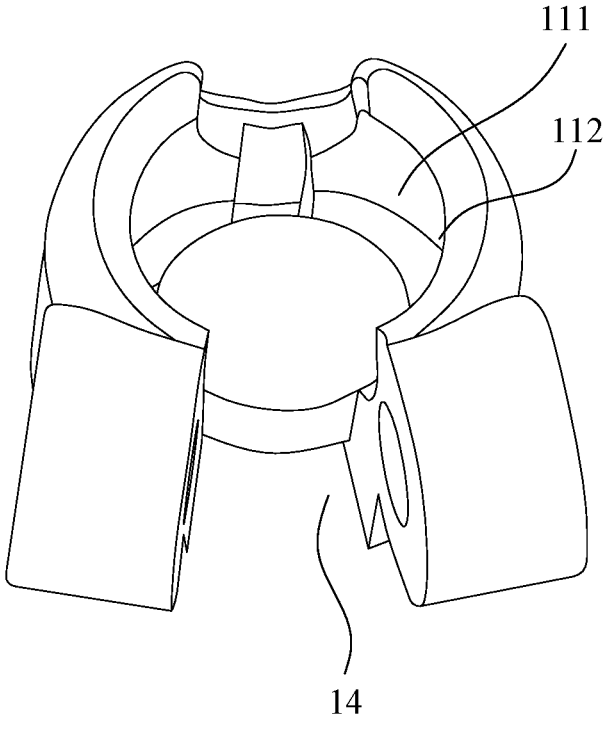
FIG. 3C is a schematic diagram of assembling a rotating shaft according to the first embodiment of the present invention.
Figure 3D:
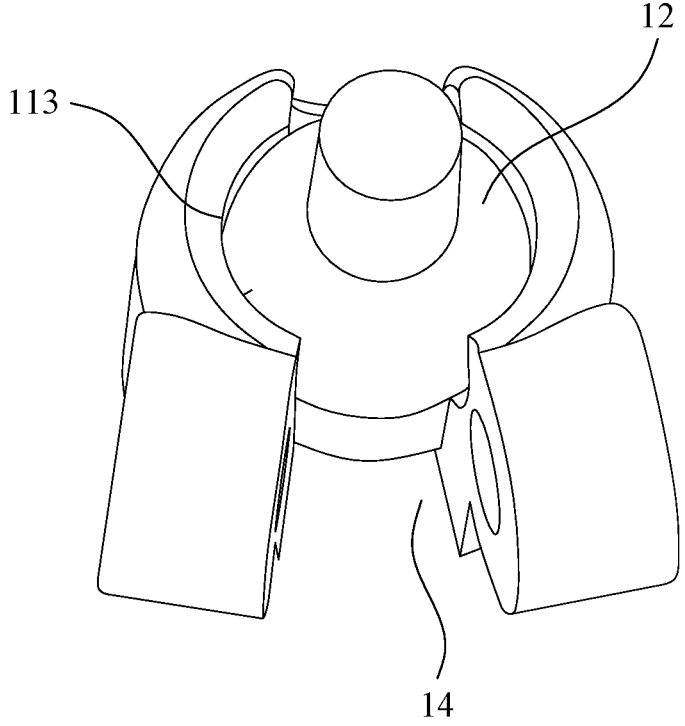
FIG. 3D is a schematic diagram of assembling a sphere according to the first embodiment of the present invention.
Figure 3E:
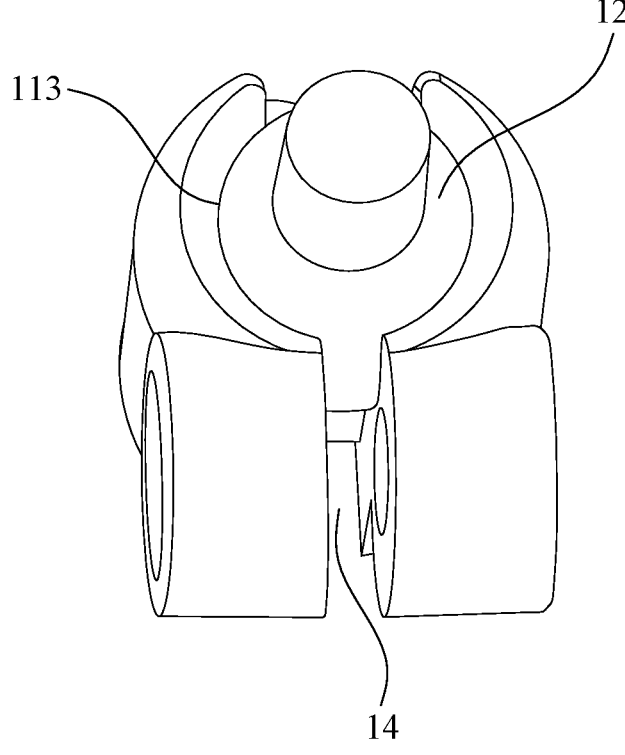
FIG. 3E is a schematic diagram of according to the first embodiment of the present invention after the sphere is assembled.
Figure 3F:
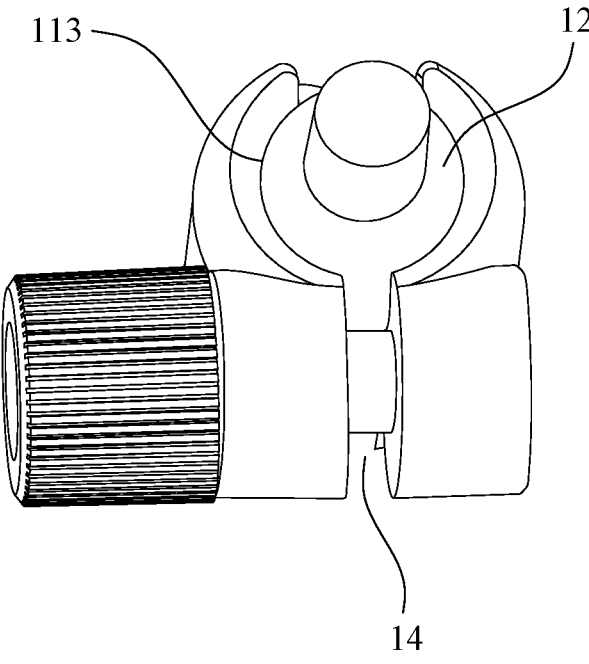
FIG. 3F is a schematic diagram of assembling a fixing assembly according to the first embodiment of the present invention.
Figure 4A:
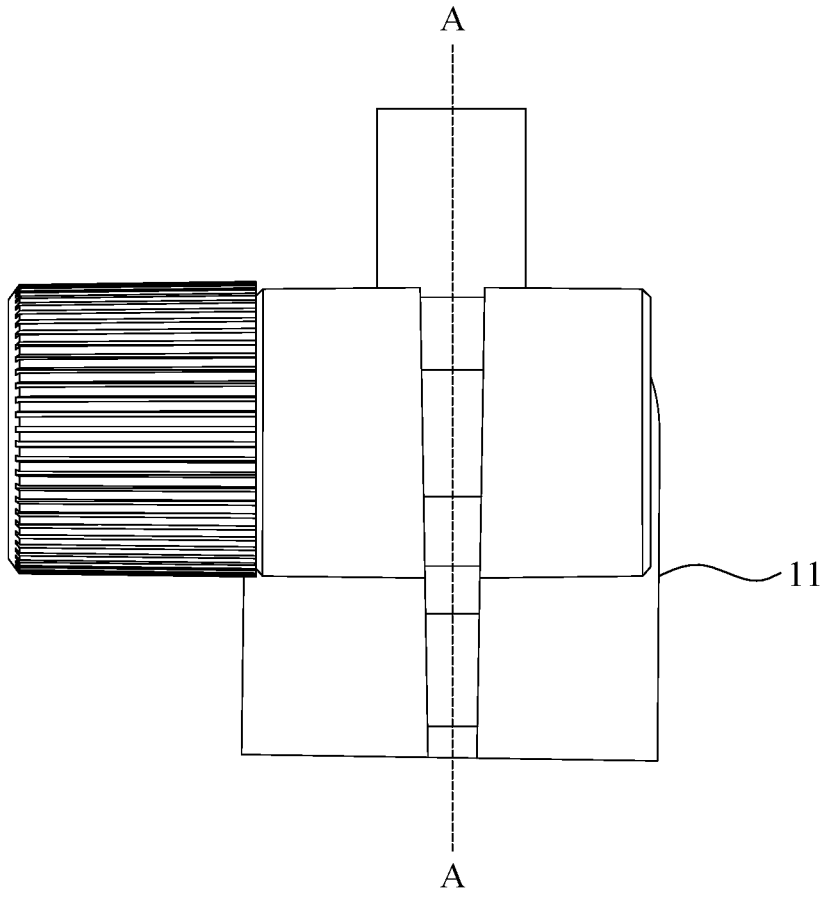
FIG. 4A is a partial schematic diagram according to the first embodiment of the present invention viewed from another angle.
Figure 4B:
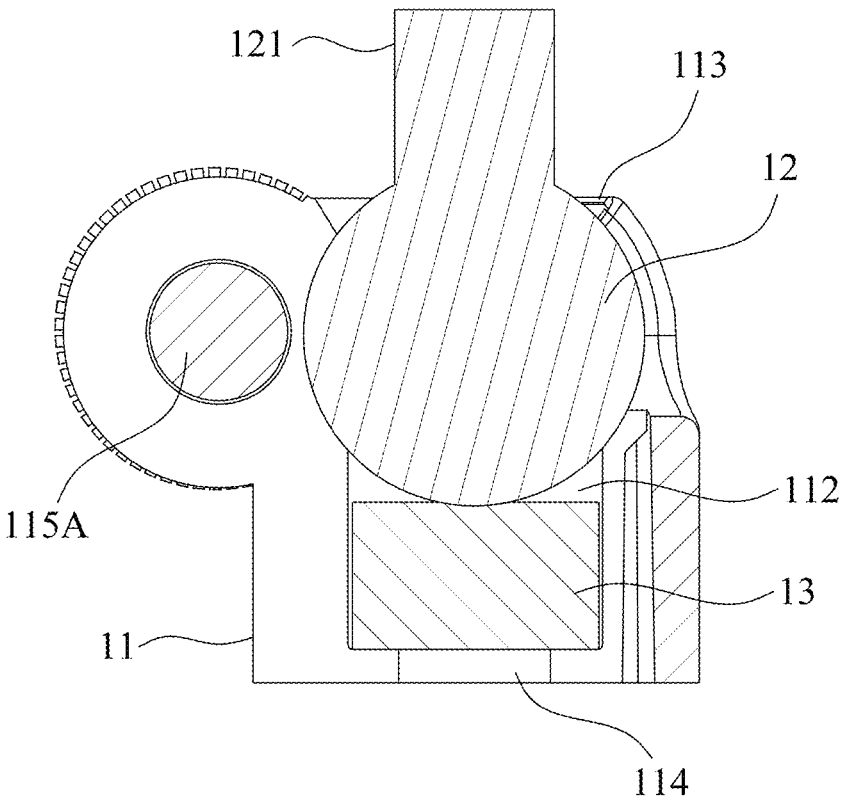
FIG. 4B is a cross-sectional view taken along line A-A of FIG. 4A according to the first embodiment of the present invention (in which the fixing assembly is locked).
Figure 4C:
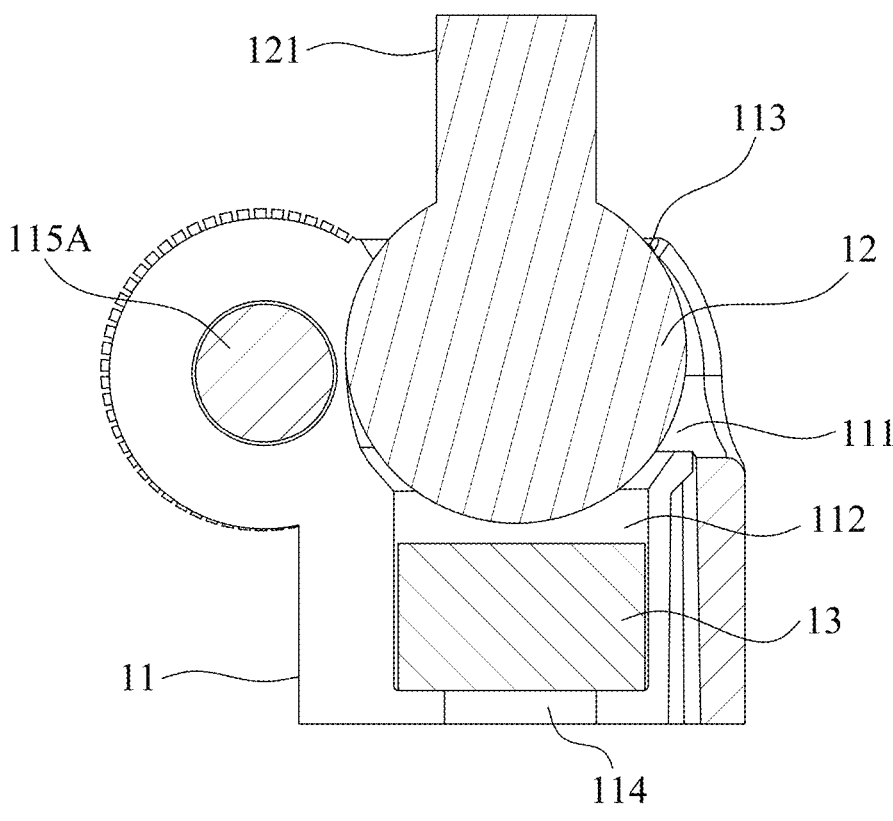
FIG. 4C is a cross-sectional view taken along line A-A of FIG. 4A according to the first embodiment of the present invention (in which the fixing assembly is loosened).

FIGS. 1 to 4C show a triaxial spherical universal joint structure 1 for connecting a first object 2 and a second object 3 according to the first embodiment of the present invention. As shown in FIG. 1, the triaxial spherical universal joint structure 1 comprises: a body 11, a sphere 12, and a rotating shaft 13. As shown in FIGS. 2A to 3A, the body 11 is provided with a sphere accommodating part 111 and a rotating shaft accommodating part 112, wherein the sphere accommodating part 111 is adjacent to the rotating shaft accommodating part 112 in up-and-down directions, the sphere accommodating part 111 extends upward to external space to form an opening 113 of the sphere accommodating part 111, the opening 113 of the sphere accommodating part 111 has a diameter less than that of the sphere accommodating part 111, the rotating shaft accommodating part 112 extends downward to the external space to form an opening 114 of the rotating shaft accommodating part 112, the opening 114 of the rotating shaft accommodating part 112 has a diameter less than that of the rotating shaft accommodating part 112, the body 11 is provided with a notch 14 extending from the opening 113 of the sphere accommodating part 111 to the opening 114 of the rotating shaft accommodating part 112, the sphere accommodating part 111 and the rotating shaft accommodating part 112 are communicated with the external space via the notch 14, a fixing assembly 115, which includes a first fastening member 115A and a second fastening member 115B, is provided on the body 11 at an appropriate position close to the notch 14 and the opening 113 of the sphere accommodating part 111. The sphere 12 is provided with a first extension part 121 extending outward from the sphere 12. The rotating shaft 13 has a shape suitable for rotating horizontally in the rotating shaft accommodating part 112. As shown in FIG. 3B, the body 11 is opened from the notch 14 to a predetermined angle. As shown in FIG. 3C, the rotating shaft 13 is placed in the rotating shaft accommodating part 112. As shown in FIG. 3D, the sphere 12 is placed in the sphere accommodating part 111, the rotating shaft 13 is connected to the first object 2 via the opening 114 of the rotating shaft accommodating part 112, and the first extension part 121 passes through the opening 113 of the sphere accommodating part 111 and is connected to the second object 3. As shown in FIGS. 3E to 3F, two portions of the body 11 opened from the notch 14 are moved toward each other. By locking the fixing assembly 115, the notch 14 is narrowed. As shown in FIG. 4B, the sphere accommodating part 111 and the rotating shaft accommodating part 112 clamp the sphere 12 and the rotating shaft 13, respectively, such that the sphere 12 is pushed downward to abut against the rotating shaft 13, thereby disabling the sphere 12 from rotating and disabling the rotating shaft 13 from rotating horizontally relative to the body 11. By loosening the fixing assembly 115, the notch 14 is broadened. As shown in FIG. 4C, the sphere 12 is released from the sphere accommodating part 111 and the rotating shaft 13 is released from the rotating shaft accommodating part 112, such that the sphere 12 and the rotating shaft 13 are disengaged from each other, thereby enabling the sphere 12 to rotate and enabling the rotating shaft 13 to rotate horizontally relative to the body 11. In the present invention, by utilizing the horizontal rotation function of the rotating shaft 13 and the appropriate shapes of the rotating shaft 13 and the rotating shaft accommodating part 112 matched with each other, after the rotating shaft 13 and the first object 2 are connected to each other, the body 11 may rotate horizontally relative to the rotating shaft 13 by releasing the fixing assembly 115, such that user may rotate the body 11 relative to the rotating shaft 13 as an axis to adjust the horizontal angle; when the fixing assembly 115 is locked, the sphere 12 is clamped by the sphere accommodating part 111 and abuts downward against the rotating shaft 13 such that the fixing of the fixing assembly 115 to the sphere 12 may be enhanced. The rotating shaft 13 may have a cylinder, cone, or sphere shape. As shown in FIG. 1, the first object 2 may be a bracket 21, a clamp, or other types of supports, and the second object 3 may be a phone clip 31, a tablet clip, or other equipment or objects. Alternatively, the first object 2 and the second object 3 may be interchangeable.

Figure 5:
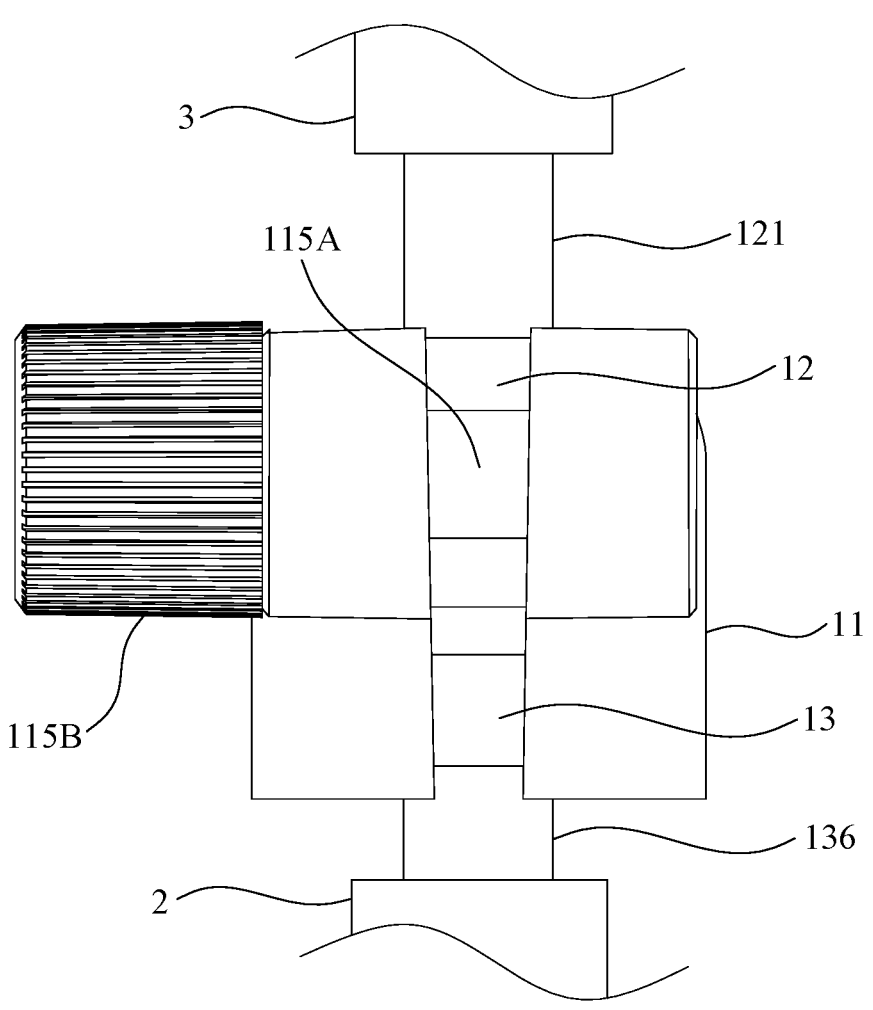
FIG. 5 is a schematic diagram according to the second embodiment of the present invention.

FIG. 5 shows a triaxial spherical universal joint structure 1 according to the second embodiment of the present invention, wherein the rotating shaft 13 has a second extension part 136 passing through the opening 114 of the rotating shaft accommodating part 112 and extending toward the external space for connecting the first object 2. In this embodiment of the present invention, the second extension part 136 may be directly disposed on the first object 2. More preferably, the rotating shaft 13 and the second extension part 136 may be directly disposed on the first object 2 to save effort and materials while achieving a more stable effect. Similarly, the sphere 12 and the first extension part 121 may be directly disposed on the second object 3.

Figure 6A:
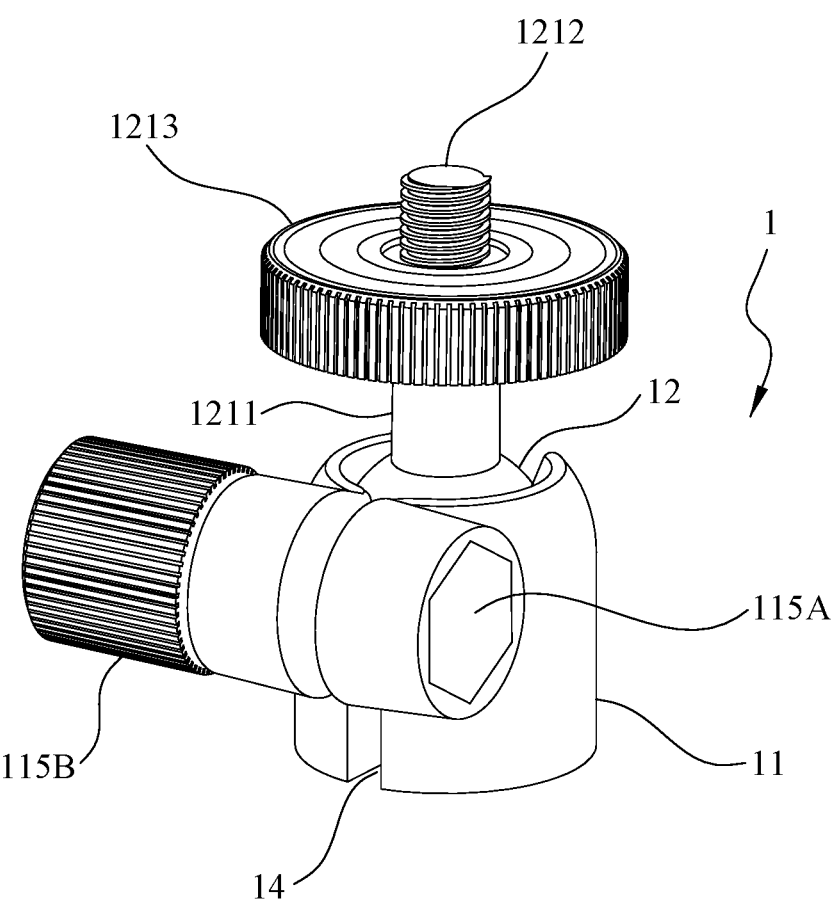
FIG. 6A is a schematic diagram according to the third embodiment of the present invention.

FIG. 6A shows a triaxial spherical universal joint structure 1 according to the third embodiment of the present invention, wherein the first extension part 121 is a first extension rod 1211, the first extension rod 1211 is provided with a thread 1212 at a distal end thereof relative to the sphere 12, a platform 1213 is provided at an appropriate position on the first extension rod 1211, and the thread 1212 is exposed above the platform 1213. In the third embodiment of the present invention, a platform nut may be provided at the center of the platform 1213, wherein the thread 1212 and the platform nut are coupled to each other and may be rotated relative to each other, thereby adjusting the relative position of the platform 1213 and the thread 1212. In the third embodiment of the present invention, the triaxial spherical universal joint structure 1 is a triaxial ball head.

Figure 6B:
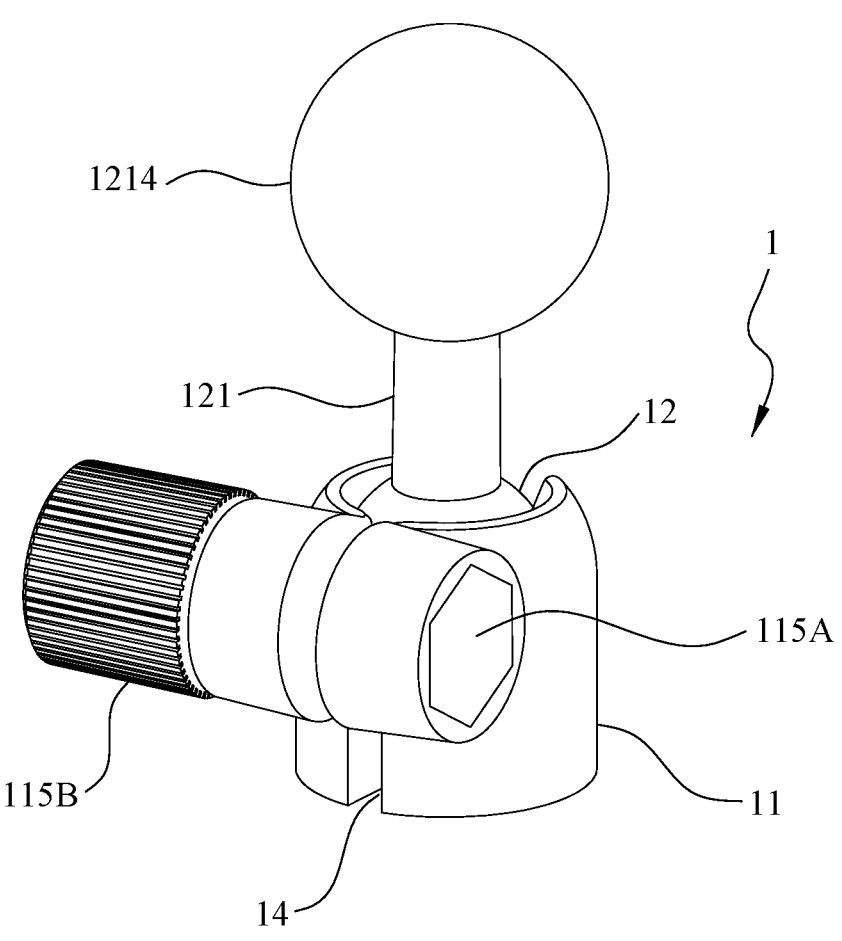
FIG. 6B is a schematic diagram according to the fourth embodiment of the present invention.

FIG. 6B shows a triaxial spherical universal joint structure 1 according to the fourth embodiment of the present invention, wherein the first extension part 121 is connected, at an end thereof, to a spherical joint 1214 for connecting the second object 3. According to the present invention, there may be various other connection forms, such as a hot shoe joint, etc. for the first extension part 121, all of which are used to connect the second object 3. Similarly, there may also be various connection forms for the second extension part 136, for connecting the first object 2.

Figure 7A:
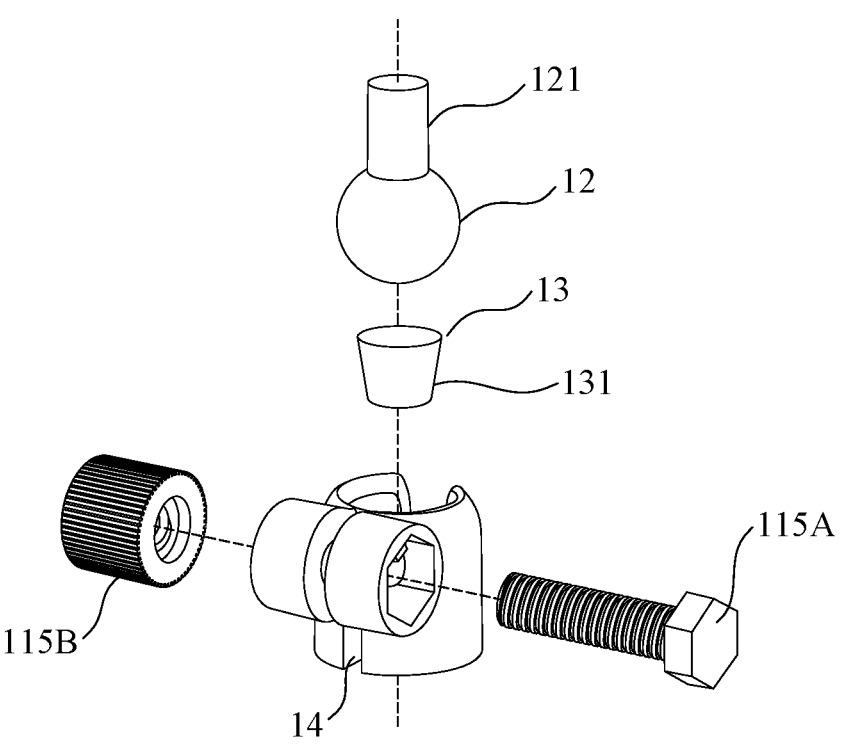
FIG. 7A is an exploded view according to the fifth embodiment of the present invention.
Figure 7B:
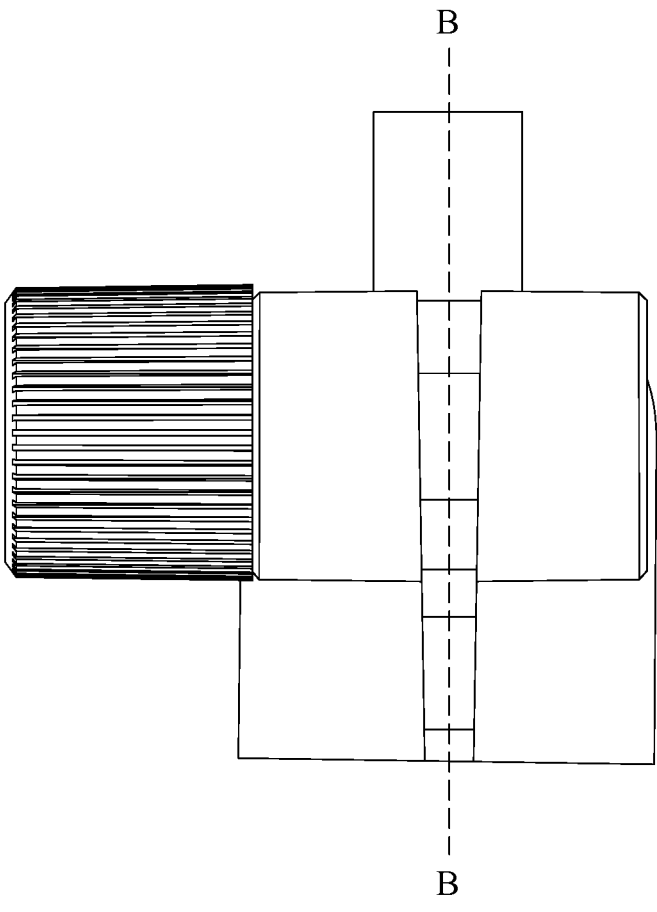
FIG. 7B is a schematic diagram according to the fifth embodiment of the present invention being assembled.
Figure 7C:
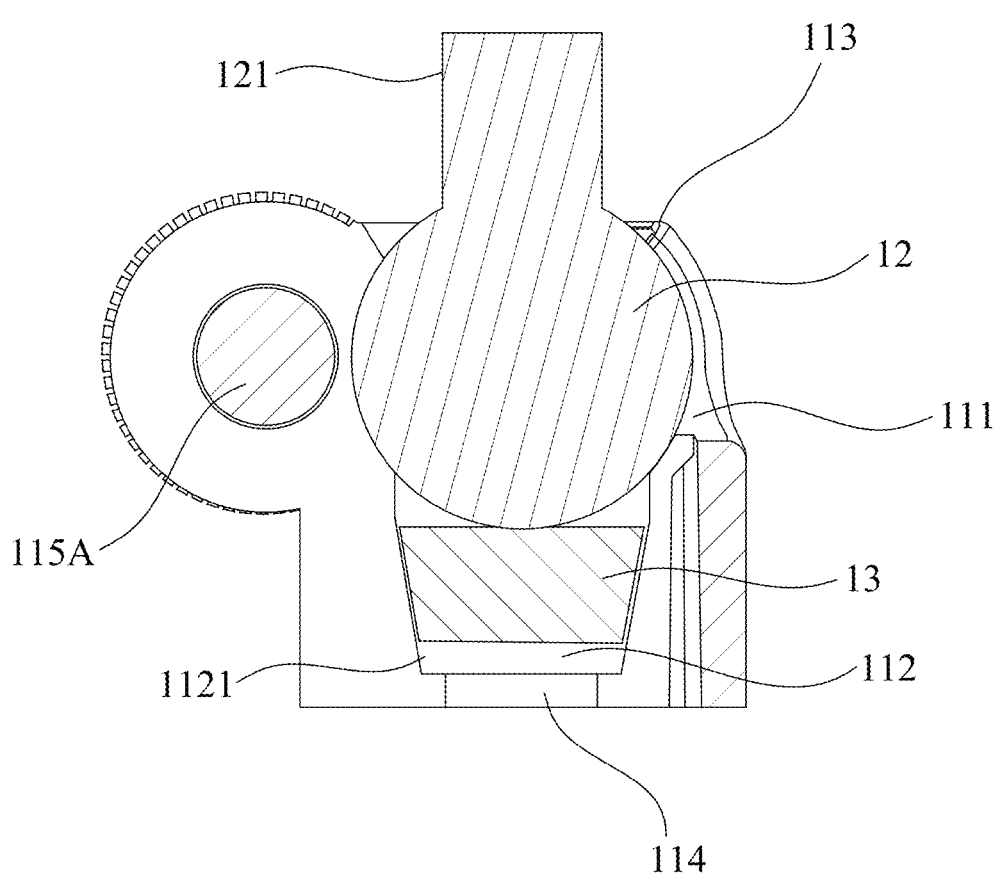
FIG. 7C is a cross-sectional view taken along line B-B of FIG. 7B according to the fifth embodiment of the present invention (in which the fixing assembly is locked).
Figure 7D:
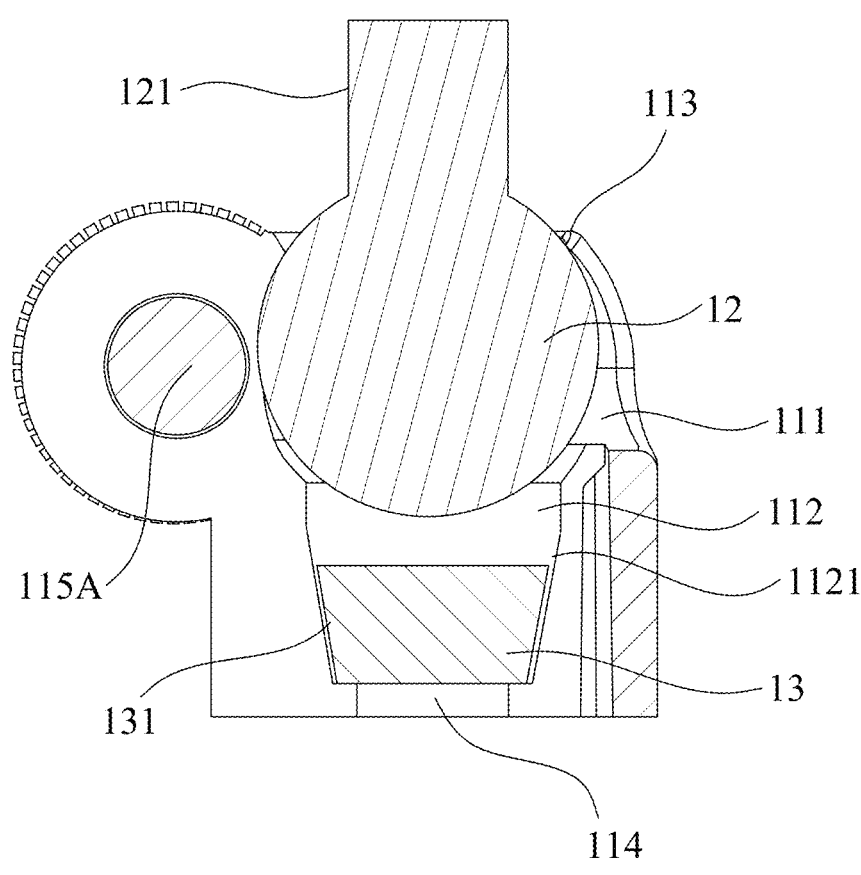
FIG. 7D is a cross-sectional view taken along line B-B of FIG. 7B according to the first embodiment of the present invention (in which the fixing assembly is loosened).
Figure 8A:
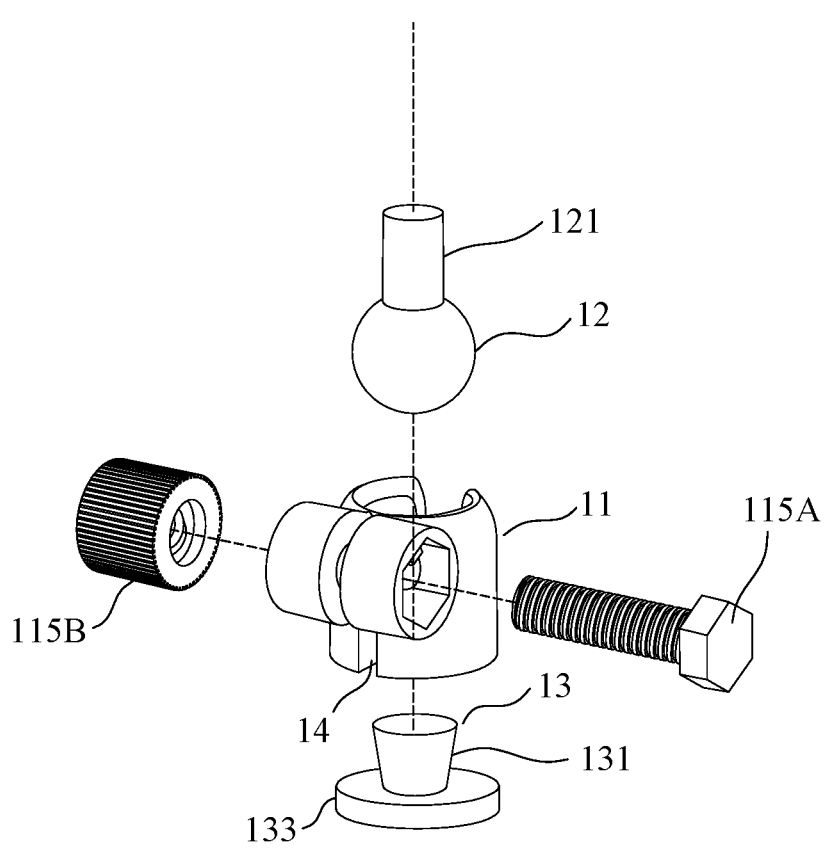
FIG. 8A is an exploded view according to the sixth and seventh embodiment of the present invention.
Figure 8B:
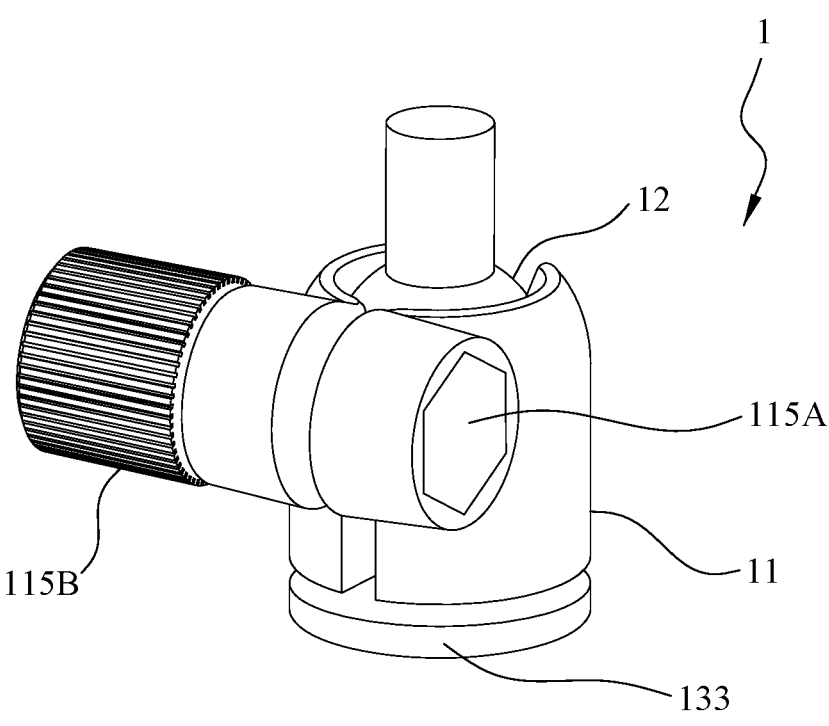
FIG. 8B is a schematic diagram according to the sixth and seventh embodiment of the present invention being assembled.
Figure 8C:
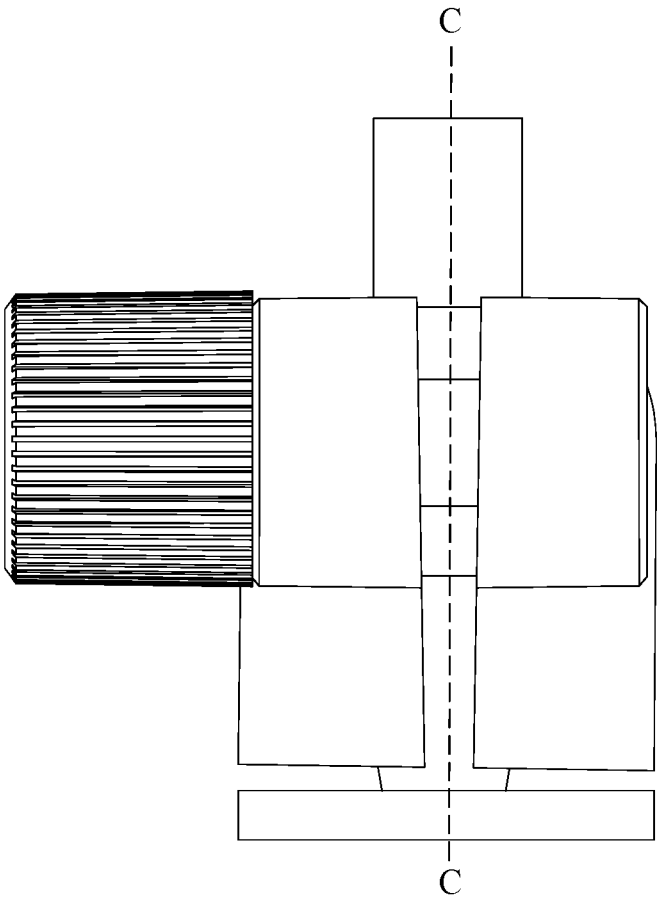
FIG. 8C is a schematic diagram according to the sixth and seventh embodiment of the present invention being assembled viewed from another angle.
Figure 8D:
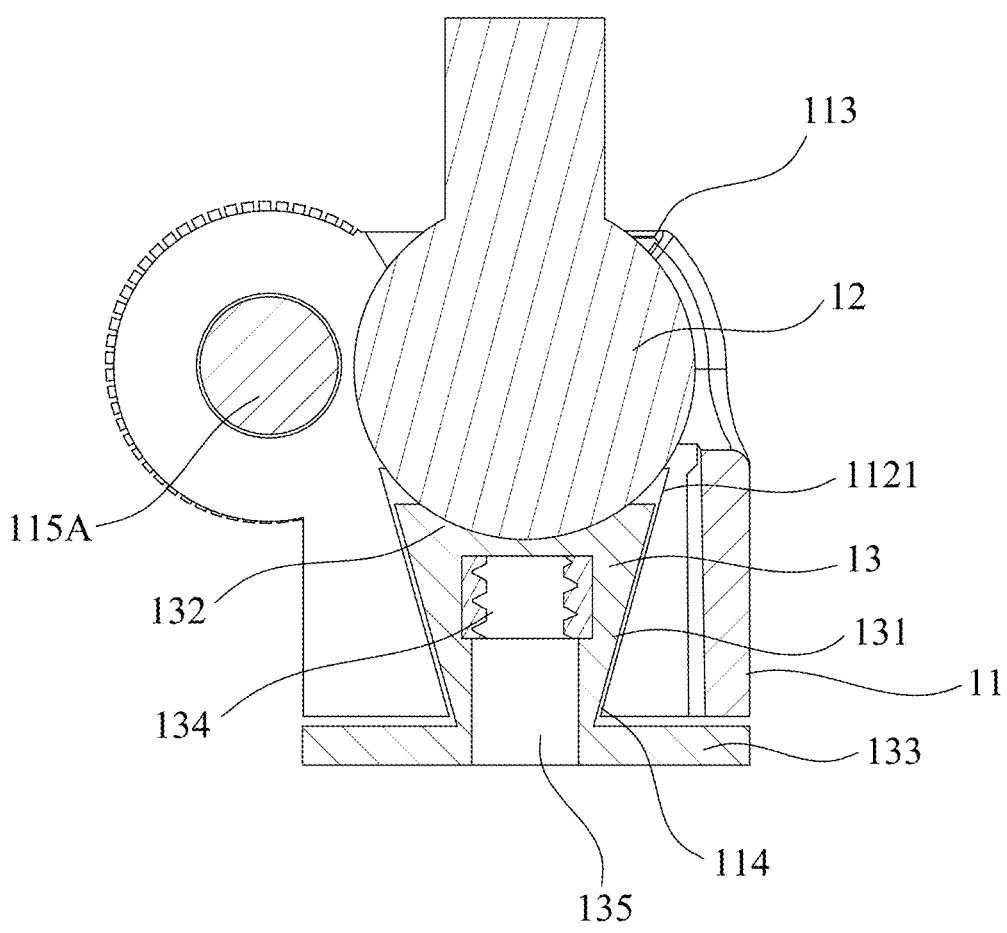
FIG. 8D is a cross-sectional view taken along line C-C of FIG. 8C according to the sixth and seventh embodiments of the present invention (in which the fixing assembly is locked).
Figure 8E:
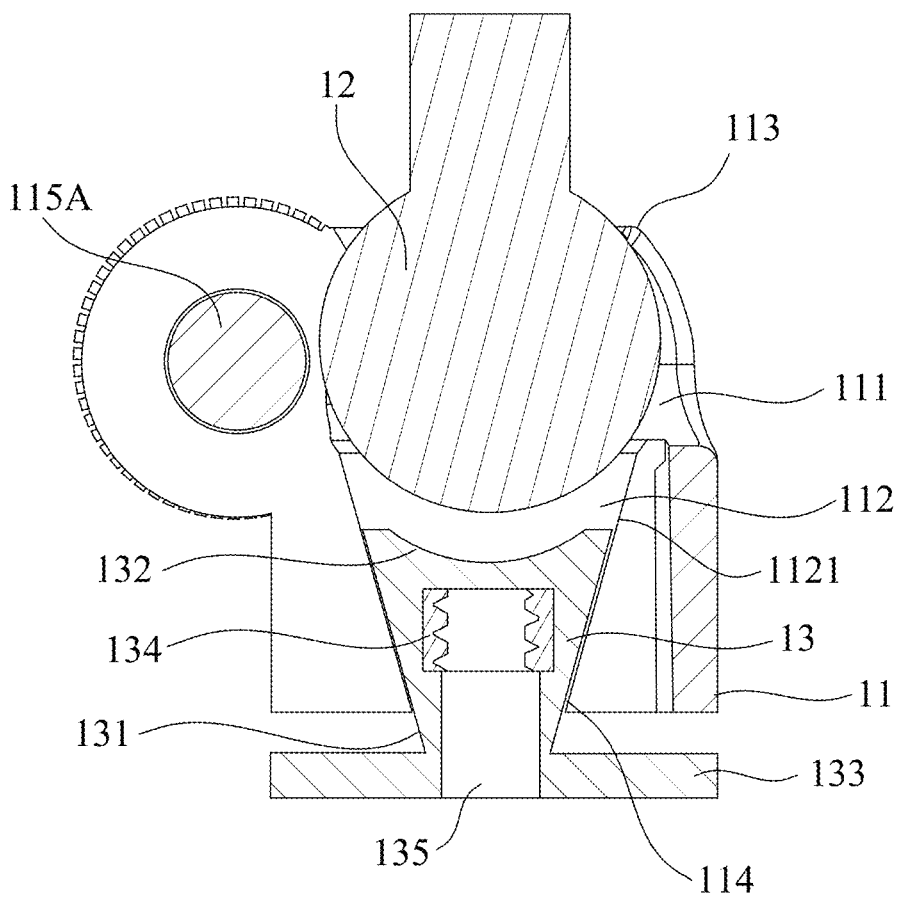
FIG. 8E is a cross-sectional view taken along line C-C of FIG. 8C according to the sixth and seventh embodiments of the present invention (in which the fixing assembly is loosened).

FIGS. 7A to 7D show a triaxial spherical universal joint structure 1 according to the fifth embodiment of the present invention, wherein a first conical surface 1121 is provided at an appropriate position on an inner side of the rotating shaft accommodating part 112, the first conical surface 1121 narrows toward the opening 114 of the rotating shaft accommodating part 112, a second conical surface 131 is provided at an appropriate position on an outer side of the rotating shaft 13, the second conical surface 131 narrows toward the opening 114 of the rotating shaft accommodating part 112, and an end where the second conical surface 131 narrows has a shape corresponding to that of the first conical surface 1121. By locking the fixing assembly 115, the notch 14 is narrowed, as shown in FIG. 7C, the sphere accommodating part 111 and the rotating shaft accommodating part 112 clamp the sphere 12 and the rotating shaft 13, respectively, such that the sphere 12 is pushed downward and the rotating shaft 13 is pushed upward, making the sphere 12 and the rotating shaft 13 abut against each other, thereby disabling the sphere 12 from rotating and disabling the rotating shaft 13 from rotating horizontally relative to the body 11. By loosening the fixing assembly 115, the notch 14 is broadened, as shown in FIG. 7D, the sphere 12 is released from the sphere accommodating part 111 and the rotating shaft 13 is released from the rotating shaft accommodating part 112 such that the sphere 12 and the rotating shaft 13 are disengaged from each other, thereby enabling the sphere 12 to rotate and enabling the rotating shaft 13 to rotate horizontally relative to the body 11. In the fifth embodiment of the present invention, when the fixing assembly 115 is locked, the rotating shaft accommodating part 112 clamps the rotating shaft 13 such that the second conical surface 131 of the rotating shaft 13 is pushed by the first conical surface 1121 of the rotating shaft accommodating part 112, making the rotating shaft 13 moves upward to abut against the sphere 12. In the fifth embodiment of the present invention, by utilizing the inclined surfaces of the first conical surface 1121 and the second conical surface 131, when the fixing assembly 115 is locked, the rotating shaft 13 is pushed upward along the inclined surfaces to abut against the sphere 12 such that the overall fixing of the sphere 12 may be enhanced. More preferably, the first conical surface 1121 may extend upward to connect to the sphere accommodating part 111, which increases moving space for the sphere 12 and the rotating shaft 13 and helps the fixing of the sphere 12.

FIGS. 8A to 8E show a triaxial spherical universal joint structure 1 according to the sixth embodiment of the present invention, wherein an arc-shaped surface 132 is provided at a top of the rotating shaft 13, and the arc-shaped surface 132 has a radian corresponding to that of the sphere 12. By locking the fixing assembly 115, the notch 14 is narrowed, the sphere accommodating part 111 and the rotating shaft accommodating part 112 clamp the sphere 12 and the rotating shaft 13, respectively, such that the sphere 12 is pushed downward, making the sphere 12 and the arc-shaped surface 132 of the rotating shaft 13 abut against each other, thereby disabling the sphere 12 from rotating and disabling the rotating shaft 13 from rotating horizontally relative to the body 11. In the sixth embodiment of the present invention, by utilizing the arc-shaped surface 132, the contact area between the rotating shaft 13 and the sphere 12 is increased, thereby enhancing the fixing. However, in practice, since it is difficult to completely fit two arc surfaces, when the arc-shaped surface 132 of the rotating shaft 13 abuts against the sphere 12, there may only be one annular contact surface or one annular contact line.

FIGS. 8A to 8E show a triaxial spherical universal joint structure 1 according to the seventh embodiment of the present invention, further comprising a rotary disc 133 having a diameter greater than that of the opening 114 of the rotating shaft accommodating part 112, wherein the rotary disc 133 is coupled to the rotating shaft 13 via the opening 114 of the rotating shaft accommodating part 112, a first fastener 134 is provided inside the rotating shaft 13, the triaxial spherical universal joint structure 1 is provided with a central hole 135, the central hole 135 extends from a center of the rotating shaft 13 toward the rotary disc 133 and is communicated with the external space, and the rotating shaft 13 and the first object 2 are fixed to each other by the first fastener 134. In the seventh embodiment of the present invention, by using the first fastener 134, the rotating shaft 13 and the first object 2 are fixed to each other. The first fastener 134 may be a bolt or a nut. In addition, other connection methods may be used instead of fasteners, for example, when a joint extends from the rotating shaft 13 and connects to the first object 2, there may be various implements for the connection methods thereof.

Figure 9:
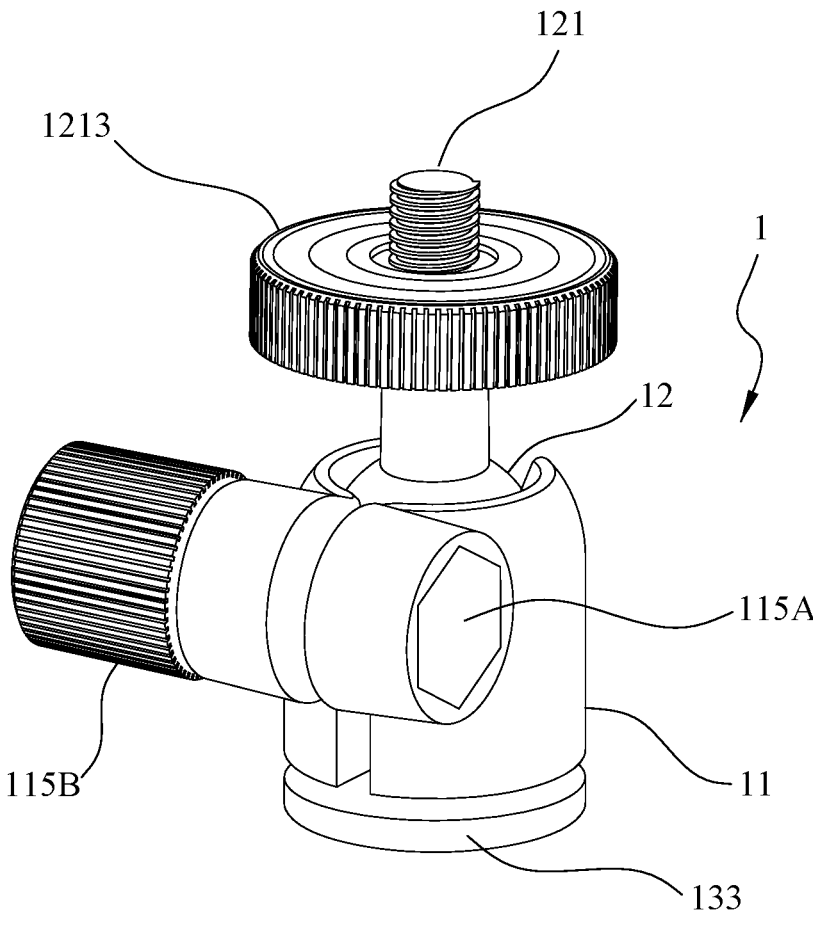
FIG. 9 is a schematic diagram illustrating that the third and seventh embodiments of the present invention are used in combination.

FIG. 9 shows an aspect in which the third and seventh embodiments of the present invention are used in combination, wherein the triaxial spherical universal joint structure 1 is a triaxial ball head with the rotary disc 133.

Figure 10A:
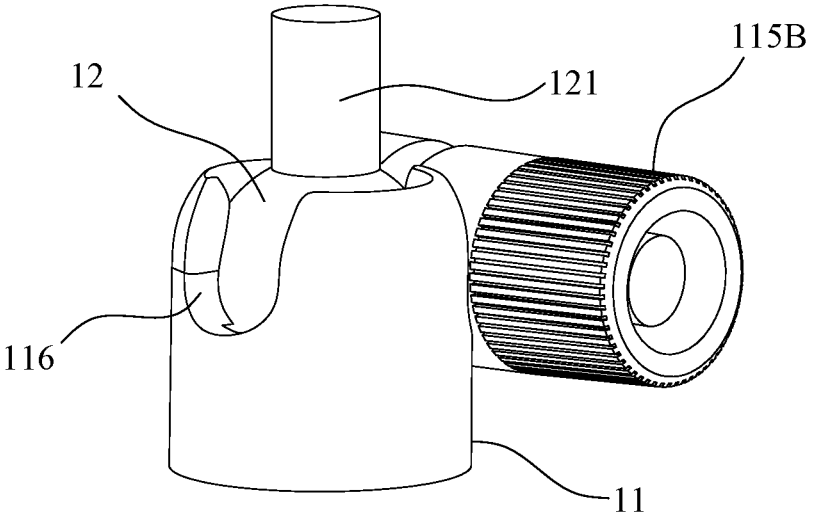
FIG. 10A is a schematic diagram according to the eighth embodiment of the present invention.
Figure 10B:
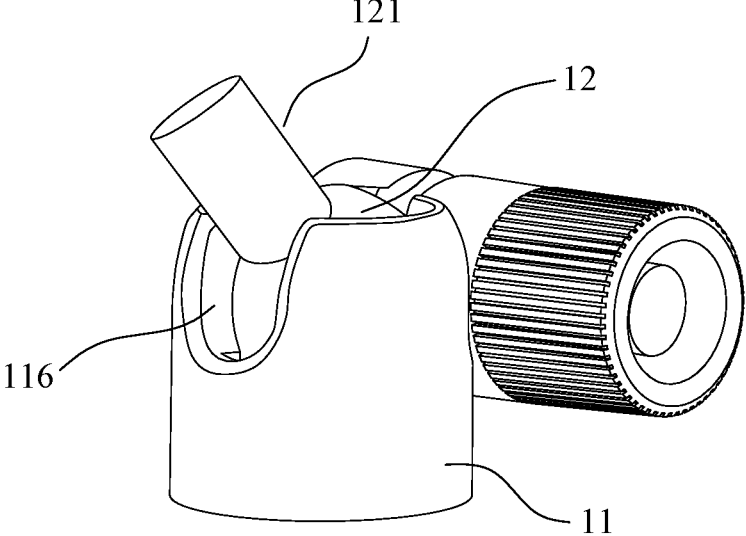
FIG. 10B is another schematic diagram according to the eighth embodiment of the present invention.

FIGS. 10A and 10B show a triaxial spherical universal joint structure 1 according to the eighth embodiment of the present invention. As shown in FIG. 10A, a U-shaped groove 116 is provided on the body 11 at a position extending downward from the opening 113 of the sphere accommodating part 111 such that the sphere accommodating part 111 is communicated with the external space via the U-shaped groove 116, and the U-shaped groove 116 is separated from the notch 14 by a certain distance. By loosening the fixing assembly 115, as shown in FIG. 10B, the first extension part 121 may be placed into the U-shaped groove 116 by rotating the sphere 12, thereby increasing the adjustable angle of the first extension part 121.

The above description and illustration are only for explaining the preferred embodiments of the present invention. Those skilled in the art may make a variety of modifications according to the appended claims and the above description. Such modifications shall contain the spirit of the present invention and shall be included within the claimed scope of the present invention.

What is claimed is:

1. A triaxial spherical universal joint structure for connecting a first object and a second object, comprising:

a body made of an elastic material, integrally formed as a single piece, and provided with a sphere accommodating part and a rotating shaft accommodating part, wherein the sphere accommodating part is disposed above and spaced apart from the rotating shaft accommodating part along a longitudinal axis thereof, the sphere accommodating part extends upward to external space to form an opening of the sphere accommodating part, the opening of the sphere accommodating part has a diameter less than that of the sphere accommodating part, the rotating shaft accommodating part extends downward to the external space to form an opening of the rotating shaft accommodating part, the opening of the rotating shaft accommodating part has a diameter less than that of the rotating shaft accommodating part, the body is provided with a notch extending from the opening of the sphere accommodating part to the opening of the rotating shaft accommodating part, the sphere accommodating part and the rotating shaft accommodating part are communicated with the external space via the notch, and a fixing assembly is provided on the body at an appropriate position close to the notch and the opening of the sphere accommodating part;

a sphere provided with a first extension part extending outward from the sphere; and a rotating shaft having a shape suitable for rotating horizontally in the rotating shaft accommodating part;

wherein a first conical surface is provided at an appropriate position on an inner side of the rotating shaft accommodating part, and the first conical surface narrows toward the opening of the rotating shaft accommodating part; and a second conical surface is provided at an appropriate position on an outer side of the rotating shaft, the second conical surface narrows toward the opening of the rotating shaft accommodating part, and an end where the second conical surface narrows has a shape corresponding to that of the first conical surface; and wherein the body is opened from the notch to a predetermined angle, such that the rotating shaft is placed in the rotating shaft accommodating part and the sphere is placed in the sphere accommodating part, the rotating shaft is connected to the first object via the opening of the rotating shaft accommodating part, the first extension part passes through the opening of the sphere accommodating part and is connected to the second object, then two portions of the body opened from the notch are moved toward each other; by locking the fixing assembly, the notch is narrowed, the sphere accommodating part and the rotating shaft accommodating part clamp the sphere and the rotating shaft, respectively, such that the sphere is pushed downward to abut against the rotating shaft, thereby disabling the sphere from rotating and disabling the rotating shaft from rotating horizontally relative to the body; while by loosening the fixing assembly, the notch is broadened, the sphere is released from the sphere accommodating part and the rotating shaft is released from the rotating shaft accommodating part, such that the sphere and the rotating shaft are disengaged from each other, thereby enabling the sphere to rotate and enabling the rotating shaft to rotate horizontally relative to the body.

2. The triaxial spherical universal joint structure according to claim 1, wherein the rotating shaft has a second extension part passing through the opening of the rotating shaft accommodating part and extending toward the external space.

3. The triaxial spherical universal joint structure according to claim 1, wherein the first extension part is a first extension rod, the first extension rod is provided with a thread at a distal end thereof relative to the sphere, a platform is provided at an appropriate position on the first extension rod, and the thread is exposed above the platform.

4. The triaxial spherical universal joint structure according to claim 1, wherein an arc-shaped surface is provided at a top of the rotating shaft, and the arc-shaped surface has a radian corresponding to that of the sphere.

5. The triaxial spherical universal joint structure according to claim 1, further comprising a rotary disc having a diameter greater than that of the opening of the rotating shaft accommodating part, wherein the rotary disc is coupled to the rotating shaft via the opening of the rotating shaft accommodating part, a first fastener is provided inside the rotating shaft, the triaxial spherical universal joint structure is provided with a central hole, the central hole extends from a center of the rotating shaft toward the rotary disc and is communicated with the external space, and the rotating shaft and the first object are fixed to each other by the first fastener.

6. The triaxial spherical universal joint structure according to claim 1, wherein a U-shaped groove is provided on the body at a position extending downward from the opening of the sphere accommodating part such that the sphere accommodating part is communicated with the external space via the U-shaped groove, and the U-shaped groove is separated from the notch by a certain distance.

* * * * *